United States Patent [19]

Schlom et al.

[11] 4,107,940
[45] Aug. 22, 1978

[54] EVAPORATIVE REFRIGERATION SYSTEM

[76] Inventors: Leslie A. Schlom, 5524 Saloma Ave., 91411; Michael B. Dubey, 5518 Saloma Ave., both of Van Nuys, 91411; Andrew J. Becwar, 818 Old Landmark La., La Canada, all of Calif. 91011

[21] Appl. No.: 766,304

[22] Filed: Feb. 7, 1977

Related U.S. Application Data

[62] Division of Ser. No. 601,873, Aug. 4, 1975, Pat. No. 4,023,949.

[51] Int. Cl.² .......................... F28C 1/00; F28D 5/00; F02M 15/00; F24F 3/12
[52] U.S. Cl. ......................................... 62/121; 62/310; 261/128
[58] Field of Search ................. 62/121, 309, 310, 314; 261/128, 140 R, 133

[56] References Cited

U.S. PATENT DOCUMENTS

| | | | |
|---|---|---|---|
| 1,798,824 | 3/1931 | White | 62/310 |
| 1,809,914 | 6/1931 | Seymour | 62/310 |
| 1,878,618 | 9/1932 | Baker | 62/121 |
| 1,965,078 | 7/1934 | Hewitt et al. | 261/128 |
| 1,986,529 | 1/1935 | Ray | 261/128 |
| 2,488,116 | 11/1949 | Berlowitz | 62/310 |
| 2,784,571 | 3/1957 | Schelp | 62/309 |
| 3,196,634 | 7/1965 | Rich | 62/315 |
| 3,905,205 | 9/1975 | Zusmanovich | 62/310 |

*Primary Examiner*—Lloyd L. King
*Attorney, Agent, or Firm*—Nilsson, Robbins, Dalgarn, Berliner, Carson & Wurst

[57] ABSTRACT

Air is evaporatively cooled by water in which the evaporating water is kept separate from the useful air (cooled air stream) by means of a heat exchanger so that cooling is performed without the addition of water vapor to the useful air, and in which the working air, absorbing the water vapor, is drawn from the load. A heat exchanger is disclosed which operates by movement of the working air internally through tubular conduits countercurrently to water flowing downwardly on the inner surfaces thereof while the air to be cooled passes externally across the conduits.

12 Claims, 5 Drawing Figures

EVAPORATIVE REFRIGERATION SYSTEM

This is a division of application Ser. No. 601,873, filed Aug. 4, 1975, now U.S. Pat. No. 4,023,949.

FIELD OF THE INVENTION

The field of art to which the invention pertains includes the field of air conditioning, more specifically the field of evaporative refrigeration.

BACKGROUND AND SUMMARY OF THE INVENTION

Evaporative air conditioners have found use in localities where there is a sufficient difference between the dry bulb temperature and the corresponding wet bulb temperature to provide a desirable heat transfer gradient without need for altering the moisture content of the useful air or for resorting to vapor compression refrigeration. For example, if the dry bulb temperature is 93° F and the corresponding wet bulb temperature is 70° F, there is a difference of 23° F available for air conditioning operation. Early coolers operated by evaporating water directly into the useful air, thereby increasing its moisture level, but subsequent coolers have been based on the fact that the occupants of an enclosure will experience a greater degree of comfort by cooling the air of the enclosure while maintaining, or reducing, its moisture content.

A variety of sophisticated designs have been proposed and utilized wherein the heat absorptive action of evaporation is employed to reduce the temperature of heat exchange apparatus and in which air is then passed through the apparatus for the purpose of cooling. The air that is used for effecting the evaporation (working air) is conducted to the outside of the room to be cooled and the air that is cooled by passing through the apparatus (useful air) is directed into the room. In this way, the heat abstracted from the liquid during the evaporation is not redelivered to the air of the room, nor is the moisture content of the useful air increased. In this regard, one can refer to the following U.S. Pat. Nos. Re. 17,998, 2,044,352, 2,150,514, 2,157,531, 2,174,060, 2,196,644, 2,209,939, 2,784,571 and 3,214,936. Additional patents of interest are: U.S. Pat. Nos. 1,542,081, 2,488,116 and 3,025,685. In more recent years, evaporative coolers have been replaced by vapor compression refrigeration units in which refrigerant fluid is alternately compressed and evaporated in a refrigeration cycle. Such units can be made quite compact, but are generally inefficient and, importantly, energy-intensive. Dwindling energy resources have required priorities in this regard to be reexamined and the need for improved, more efficient cooling devices has become evident.

The present invention satisfies the foregoing need in that it provides a highly efficient apparatus for cooling of air. The device operates more efficiently by a conjunction of features. Specifically, a heat exchanger is used that separates its dry and wet sides; evaporating water is kept separate from the useful air so that cooling is performed without the addition of water vapor to the useful air. Additionally, the major portion, preferably all, of the working air, is drawn from the load; i.e., the working air is recirculated from the enclosure to be cooled to the wet side of the heat exchanger. Furthermore, in a preferable mode of construction, the wet side of the heat exchanger operates by movement of the working air internally through conduits countercurrently to water flowing downwardly therethrough along the conduit inner surfaces, while the useful air passes through the dry side externally across the conduits.

Specific constructional details for maximum efficiency are given hereinafter. In a specific embodiment, additional increases in efficiency can be obtained by flowing the moisture-laden return air exhausting from the wet side of the heat exchanger in heat-exchange, but separated, relationship with fresh air flow upstream from the dry side of the heat exchanger. In a further embodiment, a composite, hybrid system is provided in which a minor portion only of the useful air, downstream of the dry side of the heat exchanger, is passed over the evaporator of a vapor compression refrigeration system. A sufficiently small amount of the useful air can thus be cooled sufficiently below its dew point to dehumidify that portion of the air resulting in a greater reduction in the dry bulb temperature of the useful air. Other features are provided which, while decreasing somewhat from the total efficiency of the basic system, provide a greater degree or rate of cooling than heretofore possible with evaporative coolers for specialized applications and/or for high cooling rate usage. In this regard, a particular embodiment calls for a portion of the returned air to be diverted to mix with the fresh air for further cooling by the heat exchanger. In another particular embodiment, useful under certain climatic conditions to provide a lower temperature but at higher energy levels, a portion of the cooled useful air emerging from the heat exchanger is diverted to mix with the working return air for countercurrent contact with the evaporating water.

DETAILED DESCRIPTION

As required, detailed illustrative embodiments of the invention are disclosed herein. The embodiments exemplify the invention and are currently considered to be the best embodiments for such purposes. However, it is to be recognized that the units may be constructed in various other forms different from that disclosed. Accordingly, the specific structural details disclosed are representative and provide a basis for the claims which define the scope of the present invention.

As above-indicated, the present evaporative refrigeration system is one in which the evaporating water is kept separate from the cooling air stream by means of a heat exchanger so that cooling is performed without the addition of water vapor, achieving sensible cooling. To effect the maximum cooling available at the lowest energy cost, at least a major portion, preferably all, of the working air used for the wet side of the apparatus is drawn from the room to be cooled (load), because it has a lower wet bulb temperature than outside, fresh air and thus a larger temperature differential can be obtained than if fresh air were used for that purpose. It is also preferred that the major portion of useful air, i.e., air passing through the dry side of the heat exchanger, be fresh air. A particularly useful form of apparatus to accomplish the foregoing is one utilizing an array of spaced vertically directed hollow elongated tubular members. The wet side is accomplished by gravity flow of water downwardly along the inner surfaces of the tubes in conjunction with countercurrent flow of returned air from the load, to exhaust. The dry side is accomplished by fresh air flowing in thermal conductive contact with the outer surfaces of the tubular members for cooling thereof, the cooled fresh air being delivered to the enclosure.

Figure 1:
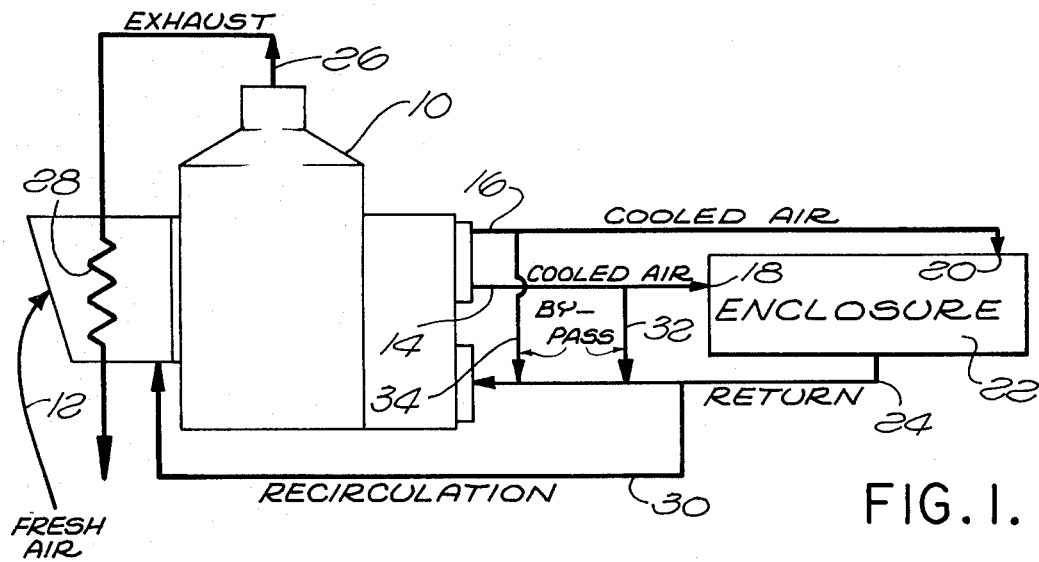
FIG. 1 is a schematic "circuit" diagram of an evaporative cooler system embodying basic concepts of the present invention.

Referring to FIG. 1, there are illustrated various air flow paths which can be utilized by the present embodiment. The system includes a heat exchanger 10 through which fresh air 12 passes on the dry side emerging as two streams 14 and 16 of cooled useful air for flowing to two different zone locations 18 and 20, respectively, of an enclosure 22 to be cooled. A stream of return air 24 is flowed back to the heat exchanger 10 and constitutes a working fluid for evaporation of water within the heat exchanger 10, as will be described in more detail hereinafter. The moisture-laden return air exits as an exhaust stream 26, which, in a particular embodiment, is flowed in heat exchange relationship, as indicated at 28, with the fresh air 12 before being disposed exteriorly of the device and of the enclosure.

In accordance with a particular variation of operation, a portion of the return air can be diverted as a recirculation stream 30 to mix with the fresh air 12. By such means, the enclosure can be cooled more quickly than otherwise, although at a higher energy cost. In accordance with other variations of operation, portions of the cooled air streams 14 and 16 can be diverted as by-pass streams 32 and 34, respectively, to mix with the working return air stream 24, passing through the wet side of the heat exchanger 10. Such a configuration is useful under certain climatic conditions to enable a lower temperature, but again at a higher energy cost.

Figure 2:
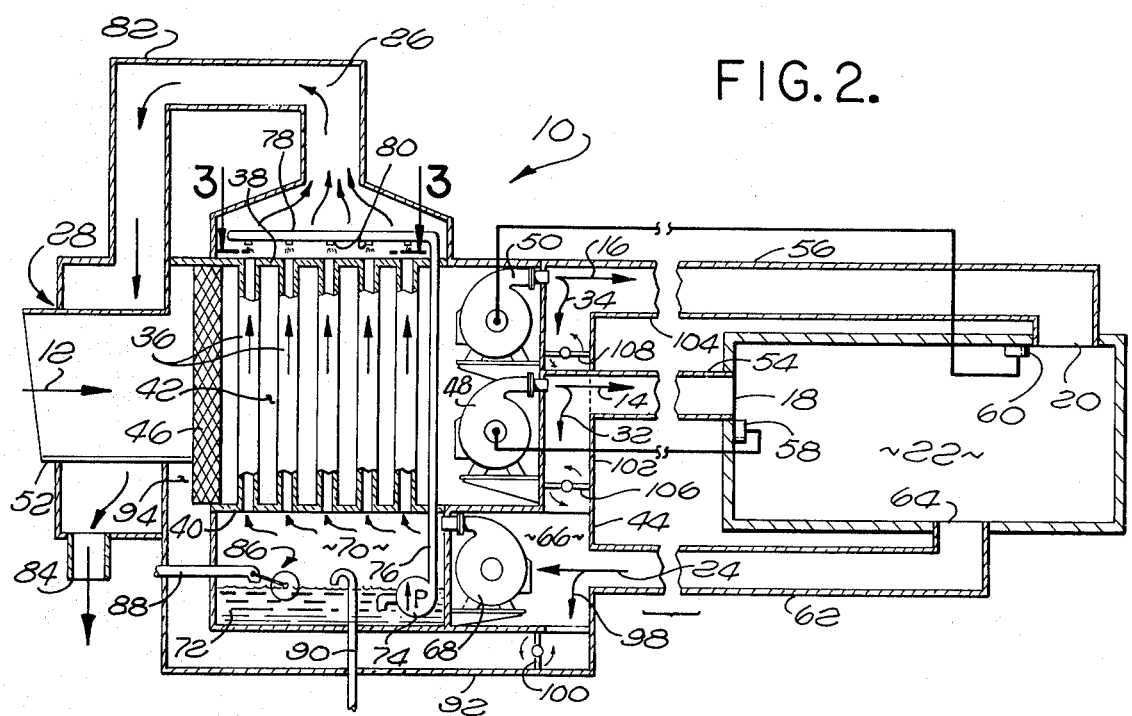
FIG. 2 is a diagrammatic elevational view of a specific embodiment of the system of FIG. 1.

Referring now to FIG. 2, the heat exchanger 10 comprises an array of spaced vertically directed hollow elongated tubular members 36 stacked between top and bottom header 38 and 40, respectively, so as to form a dry side enclosure 42 bounded on top and bottom by the headers 38 and 40, on the downstream side by a side wall 44 and on the upstream side by a filter 46. The side wall 44 is spaced sufficiently from the array of tubular members 36 so as to accommodate therein a pair of blowers 48 and 50. The blowers 48 and 50 are shown stacked one above the other, but may be disposed laterally adjacent each other. They draw fresh air 12 via ductwork 52 through the filter 46, past the external surfaces of the tubular members 36 in the dry side 42 of the heat exchanger, where the fresh air is cooled, and then distributes the cooled air to ductwork 54 and 56, opening into the enclosure 22, as the separate cooled air streams 14 and 16 referred to above. It is preferred to draw, rather than push, the useful air through the heat exchanger as such provides the most uniform air distribution without recourse to baffles, static plates or other such devices which would introduce additional resistance to airflow in the system. By using a pair of blowers 48 and 50, the cooled air can be passed to spaced zones 18 and 20 in the enclosure 22. The blowers 48 and 50 are variable speed blowers which are independently controlled by their own thermostats 58 and 60 located as desired respective the enclosure zones 18 and 20 to be cooled.

Ductwork 62 communicates with the enclosure 22 at 64 and conveys return air 24 to a blower compartment 66 in which a return air blower 68 pushes the return air into a plenum 70. The plenum 70 is disposed below and in communication with the interior surfaces of the tubular members 36 and is separated from the dry side of the heat exchanger by means of the bottom header 40. The plenum 70 also serves as a sump for containing a reservoir of water 72 for evaporation. The water 72 is fed by means of a water pump 74 and a suitable pipeline 76 to an array of manifold tubes 78 overlying the top header 38. The water 72 emerges from jets 80 in the manifold tube array 78 onto the top header 38 flowing into and downwardly along the inner surfaces of the tubular members 36, by the force of gravity, returning to the plenum 70 and reservoir of water 72 therein. The blower 68 pushes the working return air 24 upwardly through the tubular member 36 countercurrently to flow of the water 72, resulting in evaporation of a portion of the water 72, thereby abstracting heat from the walls of the tubular members 36. The moisture-laden air is discharged as an exhaust stream 36 from the top of the heat exchanger where it is conducted by ductwork 82 to a point of discharge 84. The ductwork 82 is formed with an annular section surrounding the fresh air ductwork 52 to provide a heat exchange assembly 28 to pre-cool the fresh air 12.

Although the return air 24 is shown as being pushed through the wet side of the heat exchanger by the blower 68, an alternative, somewhat more efficient, arrangement is to mount the blower at the top of the heat exchanger to draw the moist air through the wet side and into the ductwork 82.

Referring more specifically to the plenum 70, water which is not consumed in the evaporation process flows from the inner surfaces of the tubular members 36 and drips into the reservoir of water 72. The pump 74 can be a submersible pump as shown located within the reservoir of water 72, or can be external to the reservoir. Water is introduced into the plenum-sump region by means of a ball-float valve 86 connected to an input pipe 88. Scale and/or lime formations are minimized by use of a bleed-down system defined by a syphon 90. The syphon is located in the plenum, spaced just above the operational level of the reservoir 72 as determined by the ball-float valve 86 but below the level reached when operation of the unit is terminated. At that time, the reservoir water level will rise due to natural drain-back and the syphon 90 will cause a partial draining or bleed-down to expel contaminated water. Other methods of reducing contamination build-up, e.g., by means of a bleed line in the discharge line from the pump, can be used.

Other methods of water distribution than the manifold 78 can be used. For example, a trough network can be disposed over the top header 38 whereby water flows by gravity through notches in the sides of the troughs. Alternatively, a water trough system can be constructed integral with the top header 38 whereby the troughs would be disposed between the tubes and the water would flow from the troughs into and down through the tubes directly.

As earlier indicated, provision is made for recirculation of return air and for bypass of cooled air. With respect to the first provision, ductwork 92 leads from the return ductwork 62 to a region 94 adjacent the bottom of the fresh air filter 46. By such means, a portion of the return air 24 can be diverted, as shown at 98, to mix with the fresh air 12, thereby increasing the cooling rate. The amount of return air thus recirculated can be effected by means of a damper 100 disposed in the recirculation ductwork 92.

With respect to the second provision, ductwork 102 and 104 can be connected to the supply ductwork 54 and 56 to permit flow of bypass cooled air 32 and 34 therethrough to the return air blower compartment 66, regulated by dampers 106 and 108 (the lower portion of the ductwork 104 being hidden by the ductwork 102 in the view of FIG. 2). By such means a lower useful air temperature is achieved.

Figure 3:
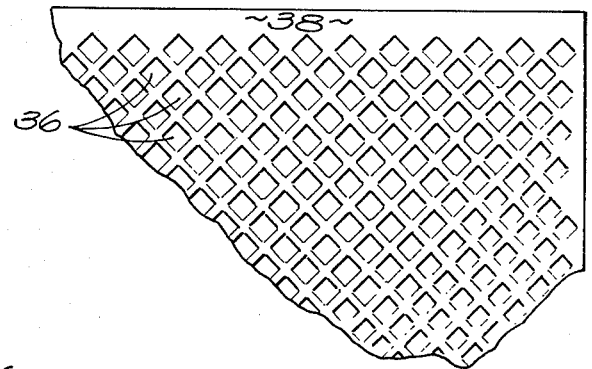
FIG. 3 is a plan view of a portion of the heat exchanger tube array and header, taken on line 3—3 of FIG. 2.
Figure 4:
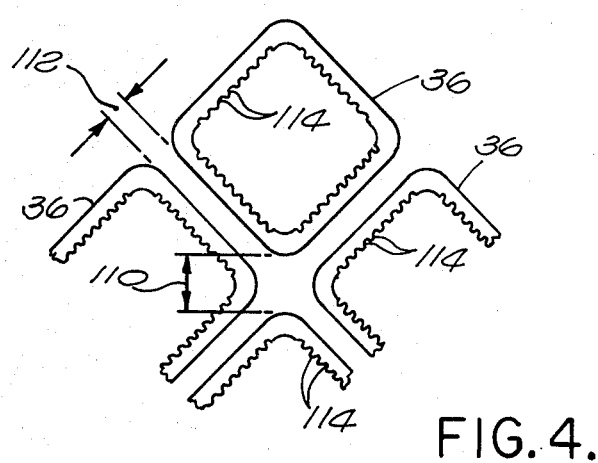
FIG. 4 is an enlarged view of a portion of FIG. 3 below the header.

Details of construction of the array of tubular members 36 can be seen in FIGS. 3 and 4. The tubular members 36 are substantially square in external cross-sectional configuration, but are formed with substantially rounded corners. By using squared tubes, an array matrix can be obtained that permits greater external surface area than other configurations. The extent of spacing between the tubes is chosen so as to obtain a desired flow rate of fresh air on the dry side. Referring in particular to FIG. 4, in the specific configuration illustrated, the distance 110 between diagonally adjacent tubes is about twice the distance 112 between laterally adjacent tubes. In general, the distances chosen with respect to any particular size tubes should be such as to permit the desired flow rate in the free area between the tubes. Preferably, the external side dimension of each tube is greater than three times the external distance between laterally adjacent tubes and a ratio of about 5.6 is illustrated in FIG. 4. Referring again particularly to FIG. 3, a portion only of the header 38 is illustrated and the specific tubular array illustrated is comprised of 449 tubes arranged in 12 rows of twenty tubes each alternating with eleven rows of 19 tubes each. The particular tubes illustrated have a wall thickness of 0.03–0.04 inch. With the specific array illustrated, and an external side dimension of 1.25 inch, lateral distance between tubes of 0.225 inch and diagonal distance between tubes of 0.45 inch, the air "sees" a dry side free area of 1.79 ft$^2$.

Again referring particularly to FIG. 4, the inner surfaces of the tubes are formed with longitudinal grooves 114 which parallel the flow of water and wet side air. The grooves serve to draw and spread the water by capillary action to wet the inner tube surfaces, providing a uniform film to enhance evaporation.

An example of the operating efficiency of the specific apparatus of FIGS. 2–4, can be calculated for a particular enclosure. With the dampers 100, 106 and 108 closed, with a heat exchanger efficiency of 80%, with fresh air at 93° F dry bulb and 70° F wet bulb, after equilibrium conditions have been obtained, at 1680 feet per minute operation, the air supplied to the enclosure will be 71.6° F dry bulb. If the enclosure heat load is 30,000 BTU/hr. the air leaving the enclosure will be 80.8° F dry bulb and 66.2° F wet bulb, with an average room or enclosure condition of 76° F dry bulb at 58% relative humidity. If in place of return air from the load, one would use fresh air as the working air for the wet side of the heat exchanger (70° F wet bulb temperature) the resultant cooled enclosure would have an average dry bulb temperature of 74.6° F instead of 71.6° F. Accordingly, there is demonstrated the importance of using the return air as the working fluid on the wet side of the heat exchanger, as provided for by the present construction. Furthermore, while it is not possible to achieve 100% efficiency, an efficiency of as much as 90% can be achieved by an increase in the number of heat exchange tubes. Under such conditions, with the present type of construction, a useful air stream can be obtained having a dry bulb temperature of 67.8° F.

The foregoing apparatus has a capacity of 30,000 BTU per hour and is comparable to a vapor compression refrigeration unit of about 37.500–42,800 BTU per hour total capacity (3–3.5 tons). Vapor compression refrigeration units have inherent limitations in the sensible capacity of their cooling coils (between 70 and 80%) whereas an evaporative cooler of the present construction is totally sensible. Furthermore, a comparative vapor compression refrigeration unit would require power consumption of from 4 to 8 killowatts whereas the above illustrated evaporative cooler has a power consumption of about 1 to 1.5 kilowatts.

Figure 5:
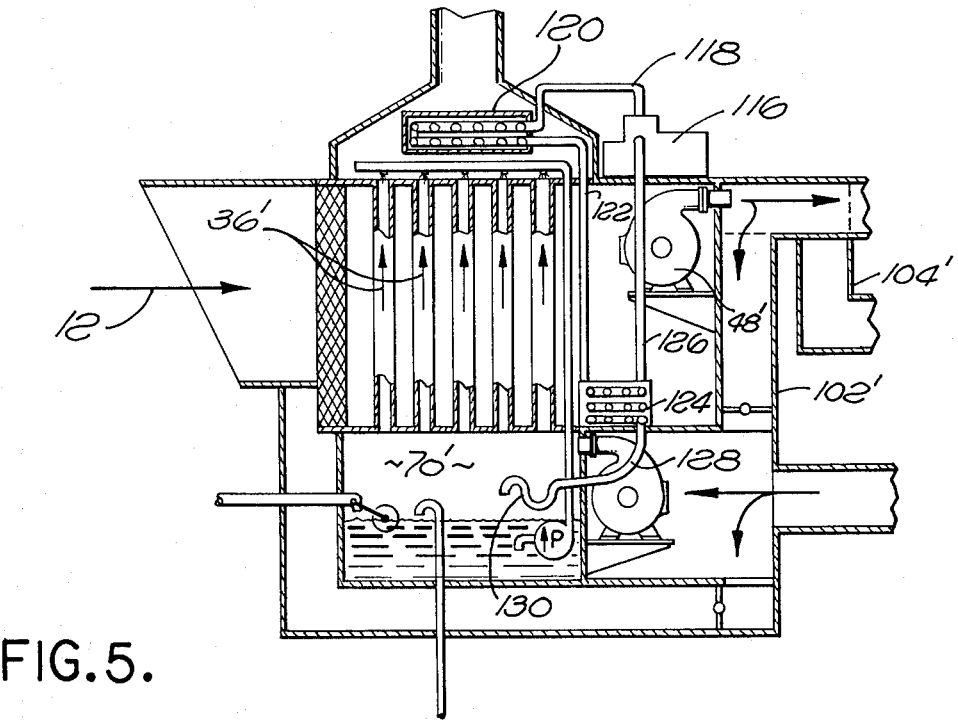
FIG. 5 is a diagrammatic elevational view of a hybrid evaporative cooler system which incorporates the components of a vapor compression refrigeration unit.

Referring now to FIG. 5, as a further embodiment of the invention, a composite hybrid system is illustrated in which a portion of the cooled air stream is further cooled by heat exchange with the evaporator of a vapor compression refrigeration unit. Otherwise, the system is substantially the same as that illustrated in FIG. 2 except for the ommission of the heat exchange ductwork, the lateral disposition of the dry side blowers (one of which 48' only is shown) and resultant modification of configuration of the associated ductwork 102' and 104'. In this hybrid embodiment, the vapor compression refrigeration unit is defined by a compressor 116 connected by appropriate refrigerant line tubing 118 to a condenser coil 120 which in turn is connected by refrigerant line tubing 122 to an evaporator coil 124 connected via refrigerant line tubing 126 back to the compressor 116. The evaporator coil 124 is disposed in the dry side compartment of the heat exchanger downstream of the tubular members 36' so as to operate in the lowest possible air temperature region within the apparatus. Only a minor portion, preferably less than 25%, of the cooled air leaving the heat exchanger is contacted by the evaporator coil 124 so that a sufficient drop in temperature is accomplished in that portion of the cooled air stream to fall below the dew point. If the entire air stream were to pass by the evaporator coil, the drop in temperature would be insufficient to reach the dew point, but with only small amount of the air being so processed, the dew point is passed and the air is dehumidified. For example, in processing 14% of the cooled air past the evaporator coil 124, a dry bulb reduction of 3.8° F can be obtained compared to operation without dehumidification.

The moisture removed from the air, which in the example, is at approximately 53° F, is collected at the base of the evaporator coil 241 and drained to the plenum region 70', by means of an evaporate collection tube 128. The evaporate water will be of lower temperature than the wet bulb temperature of the wet side air and will therefore further enhance the performance of the unit. Since the pressure at the wet side is higher than that of the dry side, a "p-trap" 130 is formed at the end of the evaporate collection tube 128, to prevent blowback of the condensed moisture into the dry side. By removing some of the moisture from the useful air, the wet bulb temperature is further reduced, so that after circulating through the enclosure or load, it is recirculated back to pass through the wet side of the heat exchanger as working air with a lower web bulb temperature, thereby cooling the heat exchanger tubes toward that lower temperature by evaporating the water on the wet side. This increases the effectiveness of the heat exchanger resulting in a further depression of the dry bulb temperature of the incoming useful air on the dry side. In the example presented herein, this additional cooling effect reduces the average enclosure temperature an additional 1° F.

As a further aid to operation and economy, the condenser coil 120 is disposed in the discharge path of the wet side of the heat exchanger. Accordingly, the condensing process takes place in an air stream of 65° F as opposed to the outside air temperature of 93° F. The combination results in significant reductions in energy required to operate the vapor compression refrigeration unit, resulting in a power requirement of only 50% of normal.

I claim:

1. A method of applying cooled fresh air to an enclosure utilizing air returned therefrom as a working fluid, comprising:
    applying vaporizable liquid to first exposed surfaces of heat exchange walls having opposite first and second exposed surfaces to moisten said first exposed surfaces;
    flowing return air from said enclosure over said moistened first exposed surfaces, as at least the majority of air flowing over said first surfaces, to evaporate said liquid by abstracting heat from said members to thereby cool said second surface and moisten said return air;
    discharging said moistened return air to a position outside said enclosure;
    flowing fresh air from outside said enclosure into thermal conductive contact with said cooled second exposed surfaces, as the majority of air flowing into said contact, to cool said fresh air; and
    conducting at least a portion of said cooled air to said enclosure.

2. The method of claim 1 including the step of recirculating a portion of return air from said enclosure into thermal conductive contact with said second exposed surfaces, as a minor amount of the total air flowing into said contact, and thence into said enclosure.

3. The method of claim 2 wherein said recirculated portion is mixed with said fresh air prior to said contact.

4. The method of claim 1 including the step of diverting a portion of said cooled air to flow over said moistened first exposed surfaces as a minor amount of the total air flowing over said first surfaces.

5. The method of claim 4 wherein said diverted portion is mixed with said return air prior to flow over said first exposed surfaces.

6. The method of claim 1 including the step of flowing said moistened return air into heat-exchange but separated relationship with said fresh air prior to contact by said fresh air with said second exposed surfaces.

7. The method of claim 1 including the step of passing a minor portion only of said cooled air over the evaporator of an operating refrigeration unit, said unit containing a compressor, condensor and evaporator operatively connected by conduits containing refrigerant fluid, prior to flow to said enclosure, to dehumidy said portion.

8. The method of claim 7 including passing said moistened return air over said condenser.

9. The method of claim 1 wherein said heat exchange walls are formed as an array of spaced hollow elongated tubes having said first and second surfaces as inner and outer tube surfaces, respectively, thereof.

10. The method of claim 9 wherein said tubes are vertically directed and said vaporizable liquid is applied to the inner surfaces of said tubes for flow by gravity therethrough and wherein said return air is flowed through said tubes countercurrently to flow of said vaporizable liquid.

11. The method of claim 10 in which said tubes are disposed between top and bottom headers on opposite sides thereof isolating spaces between said tubes from return air delivered for flow through said tubes.

12. The method of claim 11 wherein said vaporizable liquid is applied by distributing said liquid onto said top header for flow into said tubes.

* * * * *

UNITED STATES PATENT AND TRADEMARK OFFICE
CERTIFICATE OF CORRECTION

PATENT NO. : 4,107,940

DATED : August 22, 1978

INVENTOR(S) : Leslie A. Schlom et al

It is certified that error appears in the above-identified patent and that said Letters Patent are hereby corrected as shown below:

Column 1, line 43, change "2,209,939" to --2,209,999--.

Column 3, line 37, change "as a" to --as--.

Column 3, line 46, change "header" to --headers--.

Column 7, line 31, change "second surface" to --second surfaces--.

Signed and Sealed this

Tenth Day of April 1979

[SEAL]

Attest:

RUTH C. MASON
Attesting Officer

DONALD W. BANNER
Commissioner of Patents and Trademarks